Oct. 14, 1969  A. R. WINFREY  3,472,522
SEALING DEVICES BETWEEN ROTATING AND NONROTATING MEMBERS
Filed Aug. 26, 1966  3 Sheets-Sheet 1

INVENTOR.
ALVON ROYCE WINFREY
BY
ATTORNEY

United States Patent Office 3,472,522
Patented Oct. 14, 1969

3,472,522
SEALING DEVICES BETWEEN ROTATING AND NONROTATING MEMBERS
Alvon R. Winfrey, Arvada, Colo., assignor to Continental Oil Company, Ponca City, Okla., a corporation of Delaware
Filed Aug. 26, 1966, Ser. No. 575,329
Int. Cl. F16j *15/40, 9/00;* F16k *41/00*
U.S. Cl. 277—41                7 Claims

ABSTRACT OF THE DISCLOSURE

Packing for a shaft utilizing a floating ring designed to fit over the shaft which has a seal formed on the floating ring and includes a rotary sleeve assembly designed to be carried by the shaft and includes a bearing member for engaging the set of the floating ring, a bearing ring and deformable packing for preventing fluid seepage between the rotary sleeve assembly and the shaft. Another floating ring is designed to fit over the shaft and has a seal formed on the floating ring in a position to engage the bearing ring associated with the sleeve assembly.

---

The present invention relates to sealing apparatus; and in one important aspect, the present invention relates to apparatus for forming a fluid-tight seal around a rotating shaft.

Throughout industry, equipment having rotating shafts is extensively used; and, in many situations, it is necessary to prevent the flow or seepage of fluids, usually liquids, around the shaft. One of the more common situations under which this is necessary occurs with fluid pumps; and, while it is not unusual for a certain amount of seepage around the pump shaft to be tolerated, the fact nevertheless remains that in some situations such seepage, no matter how slight, is not only objectionable but can be disastrous.

A variety of seals has been designed for correcting the problem of seepage around pump shafts; however, each of these seals is subject to one or more shortcomings. For instance, while some of these seals may be satisfactory for use with liquids at normal temperatures, they fail to provide adequate safety when high temperature liquids are encountered. Still others are satisfactory only at relatively low pressures. Thus, it may be seen that, until the present invention, a practical seal for a rotary shaft, which is capable of operating under high pressures and high temperatures and which provides backup sealing in the event of the failure of a portion of the seal, has remained an elusive desideratum.

It is, therefore, an object of the present invention to provide a seal suitable for use with a rotary shaft.

Another object of the present invention is to provide a seal for use with a rotary shaft which is capable of withstanding high temperature.

Still another object of the present invention is to provide a seal for use with a rotary shaft which is capable of withstanding high pressures or vacuum.

Yet another object of the present invention is to provide a seal suitable for use with a rotary shaft having backup sealing features in the event that a portion of the seal fails.

Still another object of the present invention is to provide a seal for utilization in circumstances wherein product contamination cannot be tolerated.

Another object of the present invention is to provide a seal for a rotary shaft having automatic wear compensation means.

Still another object of the present invention is to provide a seal having the advantages of both packing and mechanical seals.

These and other advantages may be obtained from structure embodying one form of the present invention which may comprise a first floating ring designed to fit over a rotary shaft and having a sealing seat formed thereon. A rotary sleeve assembly may be provided adjacent the first floating ring; and, in a preferred embodiment, this sleeve assembly may comprise a bearing member in engagement with the seat on the first floating ring. In addition, the sleeve assembly may further comprise a bearing ring spaced from the bearing member and means for preventing fluid seepage between the bearing member and the bearing ring. A second floating ring may also be provided adjacent the sleeve assembly on the shaft, the second annular member having a sealing seat formed thereon in a position to engage the bearing ring carried by the sleeve assembly.

A more complete understanding of this invention may be obtained from a perusal of the following written description in conjunction with the appended drawings wherein.

Figure 1:
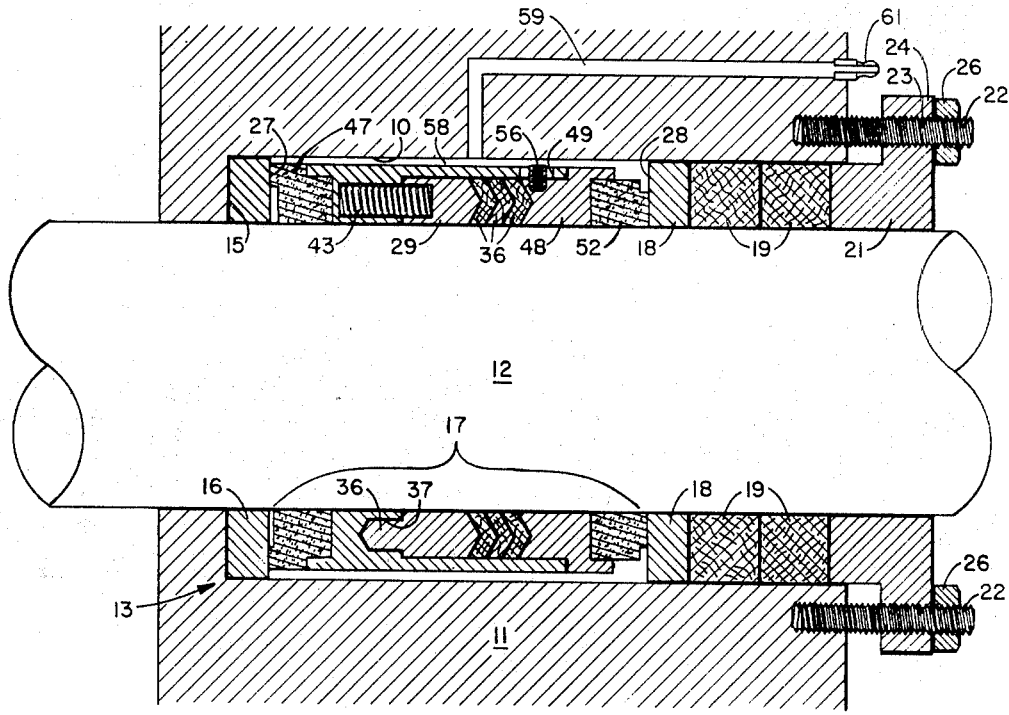
FIGURE 1 is a cross sectional view of one form of the seal embodying this invention in place around a pump shaft.

Turning now to the drawings and particularly to FIGURE 1, there is shown a portion of pump housing 11 which has formed therein an aperture 10 having a shoulder 15 through which passes a pump shaft 12. Within housing 11, shaft 12 is surrounded by a packing unit indicated generally by numeral 13 which embodies principles of the present invention. Although not shown, an impeller is operated by shaft 12 in the pump chamber indicated generally at 14 from a source of power likewise not shown.

Figure 2:
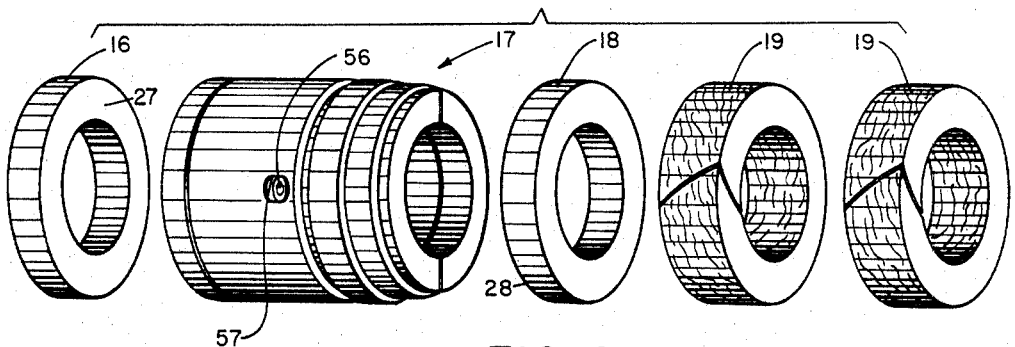
FIGURE 2 is a partially exploded view of the seal structure shown in FIGURE 1 indicating the main functional divisions of the structure.

The packing unit shown in FIGURE 1 is comprised generally of four parts which are shown in an exploded arrangement in FIGURE 2. These parts include a first floating ring 16, a sleeve assembly 17, a second floating ring 18 and annular packing elements 19. Each of these parts is maintained in the position shown in FIGURE 1 by a packing gland 21 which may be adjusted relative to pump housing 11 by means of bolts 22 anchored in housing 11 which pass through apertures 23 of a flnage 24 formed on packing gland 21. Nuts 26 are utilized to move packing gland 21 toward and away from the pump housing.

As viewed in FIGURE 1, the righthand face 27 of floating ring 16 and the lefthand face 28 of floating ring 18 are hard faced or, in a preferred embodiment, have hard carbon or graphite bonded thereto to furnish a relatively low-friction bearing surface for the portions of rotating sleeve assembly 17 which bear thereon. In addition, packing elements 19, although indicated in the drawings as two in number, vary in number from one to several depending upon the pressures and temperatures encountered by the packing unit. These elements may be of any composition well-known in the art, such as, for instance, graphite impregnated foil, fiber and the like.

Figure 3:
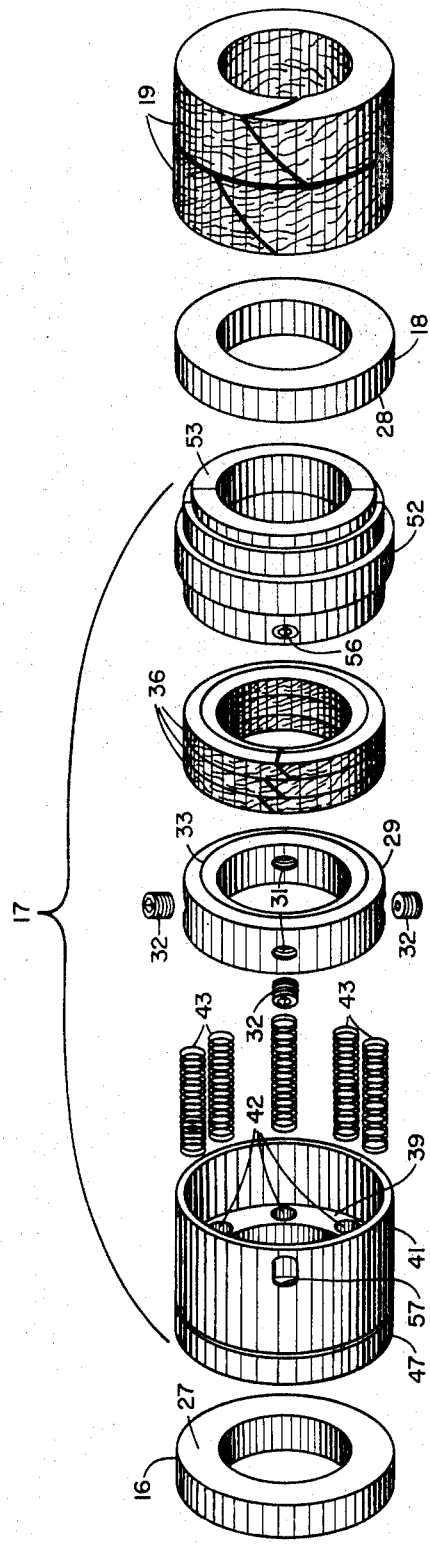
FIGURE 3 is an exploded view of the structure shown in FIGURE 2 showing the various elements of a rotary sleeve assembly which are shown together in FIGURE 2.
Figure 4:
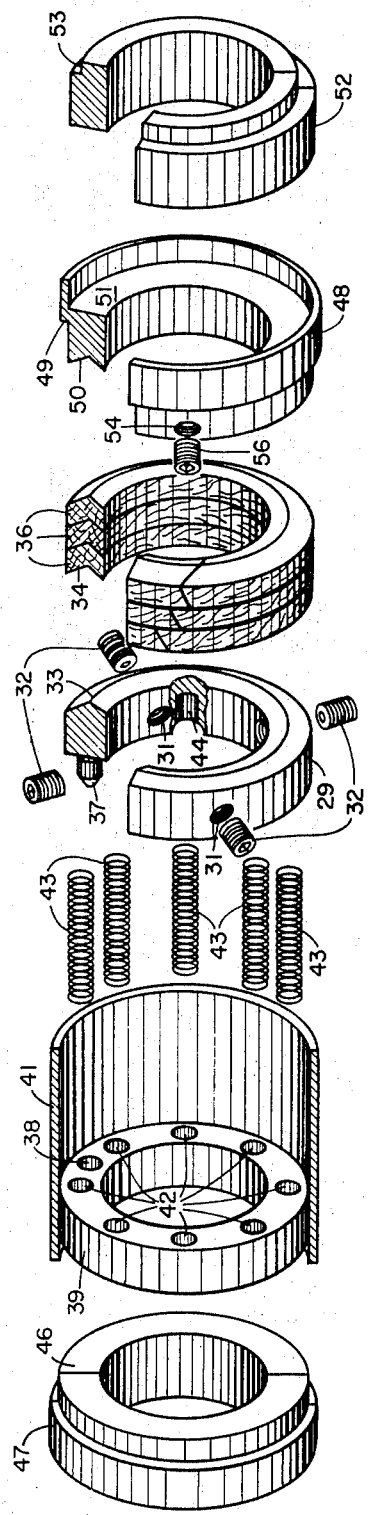
FIGURE 4 is an additional exploded view of the rotary sleeve assembly shown in FIGURE 3 wherein a portion of the sleeve assembly is shown cut away for clarity.

The rotary sleeve assembly which has heretofore been indicated by the number 17, is made up of several different cooperating parts. These parts are shown in detail in FIGURES 3 and 4 wherein it will be seen that the central portion of assembly 17 comprises a locking ring 29 which has formed therein a plurality of apertures 31 which receive set screws 32. The upper surface 33 of ring 29 is gabled and cooperates with an indented portion 34 of the lower one of a plurality of packing rings 36. As viewed in FIGURE 4, a pin 37 projects from the lower surface of locking ring 29 into a pin recess 38 formed in an annular abutment 39 which fits on the inside of a housing 41. A plurality of equally spaced recesses 42 are also formed in the upper surface of abutment 39 and function to receive a plurality of resilient members, such as, springs 43. In similar fashion, the upper ends of springs 43 project into recesses 44 formed on the lower surface of locking ring 29 at positions corresponding to the position of recesses 42.

The lower surface of abutment 39 is spaced upwardly from the lower end of housing 41 to form a recess therein which receives a neck portion 46 of a two-piece annular bearing member 47. This bearing member 47 is formed from any material which is relatively tough and which, when moved rapidly against surface 27 of floating ring 16, will not produce undue amounts of friction— hardened graphite is especially useful for this application. Moreover, neck 46 is so shaped as to form an extremely tight fit with the lower portion of housing 41.

Abutting upper packing ring 36 is a ring carrier 48 which is of reduced outer diameter at the lower portion thereof to form an exterior shoulder 49. At the lower termination of the reduced diameter section, the lower surface of ring 48 is engaged in a radial V-shaped indention 50 to mate with the upper surface of the upper packing ring 36. Inside the upper portion of ring carrier 48 is formed a relatively broad shoulder 51 on which seats a two-piece floating ring 52. As in the case of the fit between bearing member 47 and the lower portion of housing 41, the lower diameter of bearing ring 52 is extended to snugly fit within the upper portion of ring carrier 48 and abut shoulder 51. In addition, the upper portion of floating ring 52 is reduced to form an exterior shoulder 53 in order to reduce the contact area between bearing ring 52 and face 28 of the second floating ring 18. Bearing ring 52 is, in a preferred embodiment, made from the same material as is bearing member 47.

Below shoulder 49, ring carrier 48 has formed therein an aperture 54 which receives a set screw 56. As shown more clearly in FIGURES 1 and 2, set screw 56 seats within aperture 54 in such a manner that a portion of the set screw projects outwardly from the surface of ring carrier 48 and in its assembled form into a slot 57 provided in housing 41.

When packing unit 13 is used in the position shown in FIGURE 1, locking ring 29 is locked on shaft 12 by set screws 32. Housing 41 is slid into the position shown in FIGURE 1 with the upper portion of the housing in close proximity to shoulder 49 formed in ring carrier 48. In this position pin 37 carried on the lower surface of lock ring 29 projects into aperture 38 formed in the upper surface of abutment 39 to cause abutment 39, housing 41 and bearing member 47 to move with lock ring 29. Rotary motion is in turn imparted to ring carrier 48 by the side of slot 57 acting on set screw 56. By this means, rotary sleeve assembly 17 turns with shaft 12 while floating rings 16 and 18 are allowed to remain stationary due to the frictional contact with shoulder 15 and one of the packing elements 19, respectively.

An additional feature of the present invention arises from the fact that the exterior diameter of rotary sleeve assembly 17 is less than the diameter of floating rings 16 and 18. This results in a space 58 completely surrounding the rotary sleeve assembly. A grease conduit 59 is provided in pump housing 11 in communication with space 58 and is serviced through a grease zerk 61. Before packing unit 13 is placed in operation, grease is supplied to space 58 to form a viscous sealing surrounding sleeve assembly 17 whereby the total sealing effect of the unit is enhanced.

From the above description, it will be seen that the structure disclosed herein provides the advantages of mechanical seals coupled with the advantages of packers. Moreover, due to the action of springs 43, wear at the points of contact of the surface 27 and bearing member 47 is automatically compensated by release in tension of the springs. Corresponding wear between face 28 and bearing ring 52 may be compensated by operating packing gland 21. Even if these mechanical seals should fail, however, no sudden and perhaps catastrophic loss in pressure across the seal would occur due to the presence of packing elements 19 and packing rings 36.

A number of changes in structure may suggest themselves to the astute reader. For instance, as has already been pointed out, the number of packing elements 19 may be increased or decreased according to the service to which the packing unit is put while a similar change in the number of packing rings 36 may also be found desirable. More basic structural changes may also be made without departing from the spirit and scope of the present invention. For instance, the plurality of springs 43 and their associated recesses 42 and 44 may be dispensed with in favor of a single spring which surrounds shaft 12. Moreover, it is not necessary that pin 37 depend from the lower surface of lock ring 29 into a recess formed in abutment 39; rather, some other type of mechanical interlock may be provided or, if desired, a mechanical interlock between ring 29 and housing 41 may be substituted. These and other deviations may be made from the disclosed structure without departing from the spirit and scope of the present invention, which is limited only by the following claims.

Having described one form of the present invention, what is claimed is:

1. Packing for a shaft comprising:
   (a) a first floating ring designed to fit over said shaft and having a sealing seat formed thereon;
   (b) a rotary sleeve assembly designed to be carried by said shaft and comprising:
      (1) a bearing member for engaging the seat on said first floating ring;
      (2) a bearing ring spaced from said bearing member; and
      (3) resilient means for preventing fluid seepage between said assembly and said shaft comprising deformable packing located between said bearing member and bearing ring;
   (c) a second floating ring designed to fit over said shaft and having a sealing seat formed thereon in a position to engage said bearing ring; and
   (d) wherein said sleeve assembly additionally comprises a housing, the outer diameter of which is less than the diameter of said first and second floating rings and wherein said housing carries therein an abutment which is recessed to receive a portion of said resilient means, and wherein said sleeve assembly further includes a pin projecting from said locking ring into a recess in said abutment for preventing relative rotary motion between said bearing member and said bearing ring; said sleeve assembly further including reslient means to bias said bearing member away from said bearing ring, and wherein said rotary sleeve assembly further comprises a locking ring fixed to the shaft portion of said ring being recessed to receive a portion of said resilient means.

2. The apparatus defined in claim 1 wherein said assembly further comprises a ring carrier abutting said packing and wherein said means for preventing rotary motion comprises a set screw projecting from said ring carrier into a slot in said housing.

3. The apparatus defined in claim 1 wherein said rotary sleeve assembly further comprises a locking ring fixed to the shaft, a portion of said ring being recessed to receive a portion of said resilient means.

4. The apparatus defined in claim 2 wherein said means for preventing rotary motion further comprises a pin projecting from said locking ring into a recess in said abutment.

5. The apparatus defined in claim 4 wherein said rotary sleeve assembly further comprises a locking ring fixed to the shaft, a portion of said ring being recessed to receive a portion of said resilient means.

6. The apparatus defined in claim 5 further characterized by a plurality of packing elements adjacent said second floating ring.

7. A packing unit for a rotary shaft on a pump which comprises:
  (a) an annular locking ring surrounding said pump shaft, said locking ring having a plurality of cylindrical recesses formed therein on the face thereof closest the pump, the axes of said recesses being substantially parallel to the longitudinal axis of said pump shaft;
  (b) a plurality of set screws passing through at least a portion of said locking ring and engaging said shaft to securely lock said ring against motion relative to said shaft;
  (c) a cylindrical guide pin projecting from the face of said locking ring toward said pump and located thereon adjacent one of said recesses;
  (d) an annular abutment slideably mounted on said pump shaft adjacent said locking ring and on the side thereof toward said pump, said annular abutment having formed therein a recess in alignment with said guide pin and a plurality of additional recesses corresponding in size and number, and axially aligned with, the recesses formed in said locking ring;
  (e) a cylindrical compression spring seated within each pair of aligned apertures whereby motion of said abutment toward said locking ring causes compression of said cylindrical spring;
  (f) a cylindrical housing fixed to the outside surface of said abutment and extending therefrom toward said pump in one direction and away from said pump in the opposite direction, the portion of said housing furtherest from said pump surrounding said locking ring, said housing further characterized by an elongated key-way slot formed therein, the longitudinal axis of said slot being substantailly parallel to the longitudinal axis of said pump shaft;
  (g) an annular ring carrier slideably received within the end of said housing opposite said pump and adjacent said key-way slot, said ring carrier having formed therein a threaded aperture and the face of said ring carrier facing toward said housing having a V-shaped configuration with the angle of the V pointing away from said pump;
  (h) a set screw passing through the key-way slot formed in the housing and seated within the aperture formed within said ring carrier;
  (i) a plurality of annular packing rings surrounding said pump shaft and positioned between the V-shaped surface of said ring carrier and said locking ring;
  (j) a bearing member seated within the portion of the housing located toward said pump from the abutment member, said bearing member being formed from two semi-circular parts;
  (k) a bearing ring seated within the portion of said ring carrier facing away from said pump, said bearing ring being formed from two semi-circular parts;
  (l) a first annular floating ring surrounding said pump shaft in slideable engagement with said bearing member;
  (m) a second annular floating ring surrounding said pump shaft in sliding engagement with said bearing ring;
  (n) a quantity of annular packing elements carried on said pump shaft in engagement with said second floating ring;
  (o) a packing gland surrounding said pump shaft adjacent said packing elements; and
  (p) means for supplying a quantity of grease radially outwardly from said housing and from said bearing member, said ring carrier and said bearing ring.

References Cited
UNITED STATES PATENTS
| | | | |
|---|---|---|---|
| 2,836,440 | 5/1958 | Brumagim | 277—62 |
| 3,361,431 | 1/1968 | Liss et al. | 277—62 |

FOREIGN PATENTS
| | | |
|---|---|---|
| 564,714 | 10/1944 | Great Britain. |
| 863,646 | 3/1961 | Great Britain. |

LAVERNE D. GEIGER, Primary Examiner

JEFFREY S. MEDNICK, Assistant Examiner

U.S. Cl. X.R.

277—62, 65, 74, 83, 86, 105, 136